United States Patent [19]

Palcher

[11] 4,133,921

[45] Jan. 9, 1979

[54] RUBBER AND POLYMER PRESERVATIVE METHOD

[75] Inventor: Joseph J. Palcher, Santa Ana, Calif.

[73] Assignee: Very Important Products, Inc., Newport Beach, Calif.

[21] Appl. No.: 745,190

[22] Filed: Nov. 26, 1976

Related U.S. Application Data

[60] Continuation of Ser. No. 496,395, Aug. 12, 1974, abandoned, which is a division of Ser. No. 434,981, Jan. 21, 1974, Pat. No. 3,956,174, which is a continuation of Ser. No. 251,162, May 8, 1972, abandoned, which is a continuation of Ser. No. 193,984, Oct. 29, 1971, abandoned.

[51] Int. Cl.$^2$ .............................................. C09G 1/16
[52] U.S. Cl. .................................... 427/355; 427/371; 427/387; 428/447; 106/3
[58] Field of Search ............. 427/387, 355, 371; 106/3; 252/384, 407; 428/447

[56] References Cited

U.S. PATENT DOCUMENTS

| | | | |
|---|---|---|---|
| 2,702,276 | 2/1955 | Green | 106/3 UX |
| 2,927,870 | 3/1960 | Beutler | 427/387 |
| 2,955,047 | 10/1960 | Terry | 106/3 |
| 3,101,277 | 8/1963 | Eder et al. | 427/387 |
| 3,194,680 | 7/1965 | Damm et al. | 427/387 |
| 3,527,723 | 9/1970 | Stroh et al. | 106/3 X |
| 3,576,779 | 5/1971 | Holdstock et al. | 106/3 X |
| 3,591,410 | 7/1971 | Ross | 252/407 X |
| 3,929,492 | 12/1975 | Chapman et al. | 106/3 |

*Primary Examiner*—Ralph S. Kendall

[57] ABSTRACT

A process for protecting, preserving, and renewing surfaces, especially rubber and other natural and synthetic polymers, leather, wood, painted surfaces and metal. An aqueous emulsion of an unsubstituted or substituted dimethylpolysiloxane fluid, or mixtures thereof, is used to thoroughly wet the surface to be protected. After a period of penetration, preferably about twenty four hours, the surface is rewetted and allowed to penetrate as in the first application. At least one additional application and penetration gives optimum protection.

A unique preservative composition preferred for use in the above process is also provided. In addition to a dimethylpolysiloxane fluid aqueous emulsion as above described, the preservative also includes, based on the weight of the polysiloxane fluid, of from about 15% to about 65% by weight of one or more polyol compounds, preferably diethylene glycol and glycerin.

2 Claims, No Drawings

RUBBER AND POLYMER PRESERVATIVE METHOD

This application is a continuation of U.S. application for patent Ser. No. 496,395, filed Aug. 12, 1974, and now abandoned, which is a division of application Ser. No. 434,981, filed Jan. 21, 1974, now U.S. Pat. No. 3,956,174, patented May 11, 1976, which is a continuation of United States application for patent Ser. No. 251,162, filed May 8, 1972, and now abandoned, which is a continuation of United States application for patent Ser. No. 193,984, filed Oct. 29, 1971, and now abandoned.

This invention relates to improvements in materials for preserving, renewing, and enhancing the appearance of rubber, leather, and polymer surfaces.

One of the objects of the invention is to provide a superior preservative and process for application to natural and synthetic polymer surfaces and particularly rubber, to improve their appearance. Another object is to provide a preservative which will afford a substantial measure of protection to such surfaces against the deleterious effects of ozone, ultraviolet radiation, and other environmental causes of the degradation of rubbers and plastics and even leather.

While not limited thereto, a major application for the invention lies in protecting and improving the appearance of rubber parts of automobiles. Auto tires, rubber sealing strips, and vinyl tops are subject to deterioration with time due to their exposure to environmental stresses such as ultraviolet radiation, ozone, dirt, water and grease. Subjected to such environmental stresses, the rubber molecules at the surface undergo scission. The result is a structural change in the rubber surface that enables molecules of soil and other contaminants to adhere to that surface in greater degree whereby the surface becomes discolored. Further, scission of the rubber molecule chains causes surface cracking. Further release of other constituents of the rubber body that are not chemically combined with the rubber molecules but are held in place only mechanically in suspensions and otherwise is called bloom and that phenomena also results in discoloration.

The invention provides a substance which will protect the rubber against ozone, ultraviolet and the other environmental causes of chain scission. Additionally, it will seal and renew surfaces that have been damaged by scission against further scission. Further, it provides a hydrophobic surface of relatively high lubricity to which soils do not adhere.

Similarly, preservatives made according to the invention will renew, protect and enhance the appearance of plastics, particularly vinyls and acrylics, even when these plastics are ingredients in paints. The invention is particularly useful for protecting all types of rubbers, vinyls, and acrylics and even leather and wood wherever found. Furniture coverings, industrial belting, plastic mop boards are examples of important applications and illustrate the wide range of those applications.

DESCRIPTION OF THE PRIOR ART

Materials formerly used for the preservation of rubber were based on lamp black and included materials highly corrosive to metal and painted surfaces commonly found on automobiles. These rubber treatment materials were applied like paint to the rubber surfaces. The rubber treated in this manner had an unnatural "painted" appearance. Reapplications required removal of old coatings, and were difficult and inconvenient. Not only were such materials ineffective in protecting rubber surfaces from deterioration caused by environmental stresses, but they were also quite messy and inconvenient to use. In addition, the corrosive and toxic ingredients were harmful to the adjacent surfaces and to the user.

By contrast, the preservative of the invention is compounded of non-toxic materials which are safe for the user as well as for surfaces adjacent to rubber parts on automobiles. In fact, the preservative will also protect these surfaces as well. Furthermore, the preservative provides a natural look to the rubber, is easy to apply, and highly effective in protecting surfaces, particularly rubber, from ozone, ultra-violet radiation, water and smog.

SUMMARY OF THE INVENTION

The preferred preservative composition according to the invention includes an emulsion of an organopolysiloxane fluid in water, to which has been added at least one polyol compound. Polyols which are most preferred for inclusion in the preservative composition are diethylene glycol and glycerin.

In order to preserve and renew surfaces, particularly rubber surfaces, the preservative composition of the invention is first used to thoroughly wet the surface. After wetting the surface, sufficient time is then allowed for thorough penetration of the preservative into the surface layer of the material. It is believed that penetration occurs by capillary action whereby the molecules of the preservative composition, and especially the organopolysiloxane fluid, are drawn into the surface. There, the molecules can hook or wrap around the molecules of the material to be protected to physically attach themselves thereto. At least one additional rewetting of the surface should then be made, followed by a period of penetration. Preferably, at least three applications of the preservative to the surface to be protected should be made.

DETAILED DESCRIPTION OF THE INVENTION

It has been found that some measurable protection against environmental stresses can be imparted to rubber and other polymer surfaces using an emulsion of an organopolysiloxane fluid in water. When applied to a rubber surface, the water acts to swell the surface of the rubber and helps to aid penetration of the polysiloxane fluid into the rubber or polymer surface.

An object of the invention is to provide a substantial degree of protection and preservation over a substantial period of time. To this end, it has been further discovered that a significantly greater measure of protection can be imparted, especially to natural and synthetic polymer surfaces, if at least one polyol compound is added to the emulsion of the organopolysiloxane and water. Not only is a greater degree of protection and longevity thereof provided by this composition, but also the appearance is greatly improved. These consituents appear not to combine chemically but they do combine mechanically to a homogeneous mixture. Combination is facilitated by emulsifying the silicone in water and then adding the other constituents to that emulsion. The result achieved by treatment with the mixture is different, and better than the result that is achieved if the material is treated with the constituents individually.

The mixture works best when the constituents are mixed in certain proportions. Alcohol and some other soil solvents can be added as cleaners without harmful effect but pre-treatment with them achieves the same result as incorporation in the mixture. This is not true of water, however. The appearance of the surface after application is affected by the amount of water in the mixture. This is particularly apparent in the case of rubber. The degree of appearance difference is a function of the degree of deterioration of the surface at the time of application. The resultant degree of gloss appears to be less a question of how much of the other ingredients are deposited on the surface than it is a function of the mechanics by which the water serves as a vehicle for deposition of the preservative material. Thus, water is an important ingredient of the mixture although, whereas the other ingredients remain as part of the treated surface, it appears that the only function of the water is to serve as a mechanism for mechanically interrelating the other substances and facilitating their application.

The organopolysiloxane fluid or liquid silicone in the preservative are believed to be responsible for waterproofing the rubber and to impede scission. Scission is promoted by the presence of ozone and oxygen and the silicone is believed to help to exclude those materials.

The preservative of the invention requires at least one organopolysiloxane fluid. These fluids are also referred to as silicone fluids and are distinguished from silicone elastomers and resins. They are basically dimethylpolysiloxane fluids, which are substantially linear in nature. The structure of the dimethylsilicone fluid is shown by the following general formula where N is the number of units:

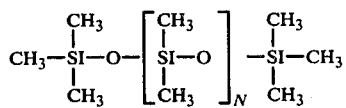

By substitution of some of the methyl groups with other organic or organo functional groups, such as vinyl, phenyl, trifluoropropyl, and amino, other organopolysiloxane fluids can be produced. The table shown on the following page, shows the properties of various unsubstituted dimethylsilicone fluids as well as those dimethylsilicone fluids having between 10 mole percent to about 35 mole percent substitution of phenyl groups.

TABLE I

| | Unsubstituted Dimethylsilicones | | | Substituted Dimethylsilicones | | |
|---|---|---|---|---|---|---|
| | | | | 10% Phenyl Methyl | 25% Phenyl Methyl | 45% Phenyl Methyl |
| Viscosity, cstk. at 25° C. | 100 | 1,000 | 10,000 | 100 | 100-150 | 500 |
| Specific gr. $\frac{25}{25}$ | 0.97 | 0.97 | 0.97 | | | |
| $n_D{}^{25}$ | 1.403 | 1.404 | | | | |
| Flash pt. min. ° F. (Open)Cup | 600 | 600 | 600 | 520 | 570 | |
| Dielectric Constant | 2.74 | 2.76 | 2.7 | | | |
| V.T.C.* | 0.60 | 0.62 | 0.61 | 0.62 | 0.76 | 0.83 |
| Freezing Pt. ° F. | −67 | −58 | −50 | | | |
| Thermal Conductivity** | .00037 | .00038 | | | | |
| Surface Tension, dynes per cm. at 25° C. | 21 | 21 | 21 | | | |
| Specific heat cal/g/° C | 0.35 | 0.35 | | | | |

*V.T.C. (viscosity temperature coefficient) is $\frac{V210 - V100}{V100}$ where $V_{100}$ is the viscosity

**Thermal Conductivity $\frac{cal. \times cm.}{sec. \times cm^2 \times °C}$ at 50° C.

Generally organopolysiloxane fluids are available as mixtures of polymers of varying chain length. It has been found for purposes of the invention that the viscosity of the silicone fluids is a measure of the effectiveness. Silicone fluids can be used which have a viscosity range up to about 100,000 centistokes. Preferably, the viscosity of the silicone fluids to be used should be in the range of from about 100 centistokes up to about 10,000 centistokes. Most preferably, the viscosity is in the range of about 300–400 centistokes. Apparently, as the viscosity becomes too great, there is difficulty in penetration of the silicone fluids into the surface to be protected. When the viscosity becomes too low, the average chain length of polymer is apparently too small to provide adequate protection.

The exact choice of an organopolysiloxane fluid or fluid mixture as described above, will depend upon the identity of the surface to be protected. It has been found that for most applications, the standard unsubstituted dimethylpolysiloxane fluid is an excellent choice, particularly for the treatment of rubber and vinyl surfaces. In other instances, it has been found that the inclusion of up to about 10% by weight, based on the weight of the dimethylpolysiloxane fluid, of a commercially available amino-substituted dimethylpolysiloxane fluid provides increased adherence to the surface to be protected. This combination is particularly advantageous for treatment of metal surfaces. The use of the phenyl and other substituted dimethylpolysiloxane fluids is a matter of choice, depending upon the material to be treated and/or the environmental stresses to which the surface will be exposed.

The silicone fluid or mixture of fluids is used in the form of a water emulsion. The amount of water which can be used is preferably from about 65% to about 660% by weight, based on the weight of the silicone fluid. However, the amount of water can be as high as about 5000% by weight if desired.

It is believed that the small particle size of the silicone in the emulsion (usually less than about ½ micron) greatly facilitates penetration of the silicone into the surface to be protected.

Emulsions of silicone fluids in water are available from several major chemical companies, including for example, General Electric Company; Silicone Products Department of Waterford, New York; Union Carbide Corporation; Silicones Division of West Virginia; and Dow Corning Corporation of Midland, Michigan. The silicone emulsions usually contain from about 35% to about 50% by weight of a silicone fluid or fluid mixture, with the remainder being mostly water and small amounts of emulsifier and adjuvant materials such as a rust inhibitor. A typical emulsion contains 35 parts by weight dimethylpolysiloxane, 10 parts by weight of an emulsifier, such as nonylphenol, 5 parts by weight of a rust inhibitor, such as sodium nitrite, and 65 parts by weight of water.

As noted above, a certain measure of protection can be imparted to surfaces by application of a silicone emulsion as obtained from the manufacturer. However, significantly greater and longer lasting protection, as well as enhanced appearance is possible by including in the preservative composition, at least one water miscible or water soluble polyol compound. The amount of the polyol compound to be included in the preservative composition, ranges from about 50% by weight to about 65% by weight, based on the weight of the polysiloxane fluid.

Examples of polyols which can be used in the preservative composition according to the invention include among others: glycerin (1,2,3-propanetriol); diethylene glycol; 1,3-propylene glycol; 1,2-propylene glycol; 1,4-butylene glycol; 2,3-butylene glycol; 1,3-butylene glycol; 1,2,6-hexanetriol; dipropylene glycol; tetramethylene glycol; pentaerythritol; dipentene glycol; tetraethylene glycol; dimethylhexanediol; 2,2-dimethyl - 1,3-butanediol; dimethyloldioxane; tetraethylene glycol; ethylene glycol; liquid polyethylene glycols, and liquid polypropylene glycols, mannitol, sorbitol, (hexahydric alcohols).

Of the above ingredients, diethylene glycol and glycerin are most preferred for use in the composition. The preferred abount of such materials to be used is, based on the weight of the polysiloxane fluid, from about 0.5% to about 10% by weight of diethylene glycol, and from about 60% to about 10% by weight of glycerin.

Diethylene glycol serves to aid in the penetration of the silicone and other constituents into polymeric materials such as rubber and plastics. It is soluble in water but once applied to a rubber surface, it also serves to seal the surface against water. In addition, diethylene glycol serves to give body to the preservative mixture and to improve adhesion of the other constituents of the preservative mixture to the surface. Glycerin also helps seal the surface, aids in penetration, and adds body to the mixture, increasing its viscosity and providing a creamy character. The combination of glycerin with silicone contributes most to the improved appearance of the surface resulting from application of the mixture.

Application is facilitated, and as previously explained, the degree of gloss can be controlled, if the mixture includes water. Advantageously, the fluid silicone is in an emulsion of the silicone in water. The other ingredients are soluble or miscible in such an emulsion and are combined into the emulsion. Dow Corning DC 36 dimethylsilicone emulsion is readily available and entirely suitable. The examples in Table II below name that material as one of the constituents and the proportions of the several ingredients are specified by setting out the number of parts by weight of those ingredients in a mixture that includes one hundred parts by weight of DC 36.

An emulsion which appears to be the equivalent of the DC 36 dimethyl silicone emulsion, at least in the practice of this invention, includes thirty-five percent by weight of a dimethylpolysiloxane fluid under ten thousand centistokes viscosity together with less than ten parts by weight of a nonionic or covalent emulsifier such as a nonylphenol together with not more than five parts by weight of a rust inhibitor such as sodium nitrite and not more than sixty five parts by weight of water. Another suitable rust inhibitor is organic phosphite.

The above formulation assumes that the end product is to provide maximum gloss to the surface to be treated. The water content is increased if a matt appearance is desired.

Also, it has been found that old or aged surfaces, particularly rubber and vinyl absorb considerably more water than newer surfaces. The maximum amount of water that can be added without degrading the protective quality of the product is approximately one hundred and sixty five parts by weight if the product is merely wiped on the surface to be treated. If the surface is scrubbed clean with the product, up to 98 percent of water will still provide a satisfactory protection and appearance. If the water percentage is to be increased to achieve a semi-gloss or matt appearance, then that water can be added by increasing the proportion of water in the silicone-in-water emulsion.

Some specific examples of preservative compositions within preferred ranges of proportion are presented below in Table II. It should be understood that the silicone emulsion formula described above can be substituted for the material unsubstituted dimethylsilicone emulsion, D.C. 36, which contains 35% by weight of dimethylsilicone having a viscosity of about 350 centistokes and an average particle size of <½ micron. The specific gravity of the emulsion at 24° C. is 0.96 and the pH is 8.5. The D.C. 36 emulsion used also contains small amounts of nonylphenol emulsifier, about 10 parts by weight; a rust inhibitor, sodium nitrite, about 5 parts by weight; and water, about 65 parts by weight.

TABLE II

| Preservative Number | D.C. 36 35% Dimethyl-silicone emulsion | Parts by Weight of Diethylene Glycol | Glycerin |
| --- | --- | --- | --- |
| 1 | 100 | 2 | 10 |
| 2 | 100 | 0.5 | 8 |
| 3 | 100 | 3 | 20 |
| 4 | 100 | 2 | 21 |
| 5 | 100 | 2 | 5 |
| 6 | 100 | 2 | 4 |
| 7 | 100 | 0.25 | 10 |

TABLE II-continued

| Preservative Number | D.C. 36 35% Dimethyl-silicone emulsion | Parts by Weight of Diethylene Glycol | Glycerin |
| --- | --- | --- | --- |
| 8 | 100 | 3.5 | 10 |

The material defined in Example 1 appears to be the best in the terms of the enhancement of the surface appearance of rubber surfaces both old and new and in terms of its protective character. The second example sets out what is considered to be a product which, although not quite as good, also performs well the functions of enhancing appearance and providing protection. The third example sets out a composition that provides satisfactory results at any range of added water from one to one hundred parts by weight.

Examples 4, 5 and 6 include what is considered to be the optimum quantity of diethylene glycol. Example 4 with its twenty one parts of glycerin is noticeably less desirable than the Example No. 3 with only twenty parts of glycerin. Accordingly, the conclusion is drawn that a preferred formulation includes less than twenty one parts by weight of glycerin. Example 5 with its five parts of glycerin is satisfactory whereas Example 6 with four parts of glycerin appears to have less merit. It is concluded that at least about five parts of glycerin are required in the preferred material.

Examples 7 and 8 attempt to find the limits of diethylene glycol inclusion. Whereas in Example 2 one half part of diethylene glycol appears to be satisfactory, in Example 7 the inclusion of only one fourth of one part of diethylene glycol appears to provide a less than completely satisfactory result notwithstanding that the amount of glycerin is ten parts by weight which is considered to be optimum. Similarly, while three parts by weight of diethylene glycol result in a satisfactory material in the Example 3, it appears that too much diethylene glycol is included in the Example 8.

Less desirable, but still a good, inexpensive and easily applied product is provided by mixing only silicone emulsion with glycerin. In the preferred range of proportions, the mixture includes more emulsion than glycerin. This form is intended primarily as an additive to wash water or isopropyl alcohol used for washing tires. It will not harm the tires or automobile parts or paints if used without dilution although to use it that way is wasteful. The percentage of glycerin is relatively great so that the product has "body" enough to inspire confidence and encourage dilution.

The silicone emulsion has a milky appearance, if it is desired to change the coloring to enhance marketability, that can be done. One of the advantages of the invention is that water soluble dye can be added in quantities small enough to alter the product's appearance materially without affecting the coloring of the surface to be treated.

In addition to rust inhibitors and dyes, other adjuvant materials, for example ultraviolet absorbers, can be added to the preservative composition of the invention. These materials are advantageously used but are not critical to the composition. For example, in some instances it might be desirable to include small amounts of an antifoam agent to aid in bottling of the preservative. In addition, an antimicrobial could be added to increase shelf life of the preservative and to aid in imparting such resistance to treated surfaces. Such adjuvant materials should, however, be water soluble or water miscible.

Various other adjuvant materials are known, and the use thereof will be apparent to those skilled in the art.

The mixtures that are preferred for rubber treatment are preferred for the treatment of polymers generally and the description above, while primarily cast in terms of rubber treatment, is equally applicable to treatment of synthetic rubbers, vinyls, acrylics, other plastics, painted surfaces, wood, leather and the like.

PROCESS

In practicing the process of the invention, whether using the emulsified silicone in water alone, or the preferred preservative composition of the invention, it has been found that there are several important steps to be taken.

First, the surface which is to be treated should be thoroughly wetted by the preservative composition. This can be accomplished in any convenient manner, such as by rubbing, spraying, painting, immersion and the like.

After wetting the surface, it is important to allow sufficient time for the preservative composition to penetrate the surface. During this time, it is believed that the preservative composition is taken into the surface pores by capillary action. For best results, a period of from at least about 24 hours should be allowed for penetration. If lesser periods are resorted to, optimum results will not be achieved. If desired, any surface excess can be removed by a light rubbing, after the penetration period.

At least one additional application of the preservative should then be made to the surface in the same manner as for the first process steps. After waiting an additional twenty four hours, the surface can then be lightly buffed with a soft cloth to provide increased gloss, if desired. Preferably, however, the preservative is applied to the surface at least three times, with a twenty four hour lapse of time for penetration between each application.

By following these steps, maximum protection of the surface which is being treated will be obtained for the longest period of time. Additional coatings can be applied if desired. However, it is believed that in most cases, three applications are adequate.

In addition to the advantages mentioned, the surfaces treated with the preservative composition of the invention shed water and dirt, and cut static electricity. In addition, the protective, inner molecular surface layer which is formed protects against ozone, ultraviolet rays, oxygen, and elements of smog, such as nitrogen oxides, nitric acid vapor, and sulphur oxides.

Furthermore, the appearance of the surface after treatment is very natural, providing a soft lustre even to severely damaged surfaces, such as rubber tires.

While the invention was primarily designed for use on rubber and vinyl and equivalent polymer materials, it has been found to work equally well on many other surfaces, including for example, leather, wood, paint, and many other materials.

The following examples are presented for purpose of illustrating the invention and are not intended to constitute a limitation thereof.

EXAMPLE 1

A preservative according to the invention was tested according to the methods outlined in A.S.T.M. D-518, Procedure B, Outdoors Southern 45° Exposure Testing, using as the testing material, natural rubber swin fin stock of a non-black rubber material.

The preservative composition which was used was comprised of 100 parts by weight of an aqueous emulsion, containing 35 parts by weight of unsubstituted dimethylpolysiloxane fluid, 10 parts by weight nonylphenol emulsifier, 5 parts by weight of sodium nitrite rust inhibitor, and 65 parts by weight of water. The dimethylpolysiloxane fluid had a viscosity of about 300 centistokes and a particle size of less than ½ micron. The specific gravity of the aqueous emulsion at 77° was 0.99, and the pH was 8.5.

To the above described aqueous silicone emulsion was added, with stirring, 50 parts by weight of water, 8 parts by weight of glycerin, and 2 parts by weight of diethylene glycol. When thoroughly mixed, the resulting preservative composition was used as described in the following procedure.

Ten, bent loop samples of natural rubber type swin fin stock were mounted side by side on a wooden test fixture and numbered one through ten. Sample No. 1 was left untreated throughout the test, and samples 6 through 10 were cleaned prior to the application of the preservative with isopropyl alcohol.

Sample No. 2 was wetted with the preservative composition and allowed to dry for one hour. At the end of this time, the surface was rubbed lightly, followed by a 24 hour drying period, and a final light buffing.

Sample No. 3 was wetted with the preservative composition and allowed to dry for one hour. The preservative was applied a second time followed by a one hour drying period and a light buffing. After 24 hours, the preservative was applied again, followed by a one hour dry period, after which the surface was rubbed lightly and buffed.

Sample No. 4 was wetted with the preservative composition, followed by drying for one hour, and lightly rubbing. After 24 hours, the sample was lightly buffed, followed by another 48 hour period, after which a second application of the preservative was made. This was allowed to dry for one hour, then rubbed lightly, followed by another 24 hour drying period, and a light buffing.

Sample No. 5 was treated in the same manner as Sample No. 3, except that an additional application was made after seven days. After drying for one hour, the surface was lightly rubbed, followed by a light buffing.

Samples 6 through 10 received a treatment which corresponded respectively to Samples 1 through 5 except for the initial isopropyl alcohol cleansing.

Except for the actual application of the preservative, and light wiping or buffing which was done with a soft cotton cloth, the samples were kept out of doors. It should be noted that the rubber swin fin stock which was used for the experiment, was made of a water resistant material which results in a somewhat slower penetration time of the preservative, as would be the case for average rubber compositions.

RESULTS

In examining the surface of the samples, a ten power magnification glass was used in place of the seven power magnification called for in the A.S.T.M. test. The testing was terminated after 30 days, during which time a light buffing to remove accumulated dirt and dust was applied to the samples after 10, 20 and 30 days.

Control Sample No. 1 which received no treatment with the preservative showed cracking after two days. The cracking initially appeared as a slight chalking on the surface which became more severe with each passing day to form severe and deep cracks after seven days, when equilibrium was established.

Sample No. 2 showed cracking after three days on roughly five percent of the total area. The cracks became progressively larger and deeper over the fourth, fifth, and sixth days, to finally cover approximately 25% of the total area. After the seventh day, equilibrium was established.

Sample No. 3 showed a very small amount of cracking on about one percent of the area after three days. The cracking became more severe and gradually increased to about 25% of the surface area during the fourth through seventh days, after which equilibrium was established.

Sample No. 4 showed no cracking, even after 40 days. After this point, the test was stopped.

Sample No. 5 showed a few small cracks on about one percent of the surface area after four days. On the seventh day when another application of the preservative was administered there had been no further change. The cracks grew slightly larger and deeper after the tenth day when equilibrium was established.

Control Sample No. 6 showed small cracks on about 50% of the surface area after about two days. These cracks became progressively more severe until about 70% of the area was cracked after the fourth day. In addition, there was spotty chalking, and the cracking grew even deeper until the tenth day, when equilibrium was established.

Sample No. 7 showed a few tiny, short cracks on about 1% of its surface area after three days. These cracks became progressively more severe until about 35% of the surface area was affected by the tenth day, when equilibrium was established.

Sample No. 8 showed a few small cracks on less than 1% of its surface area after about four days. These cracks became more severe and a few additional cracks showed, up to the tenth day when equilibrium was established.

Sample No. 9 showed no cracks throughout the test.
Sample No. 10 showed no cracks throughout the test.

It was found that when two to three applications of the preservative were made to the samples, allowing for a 24 hour period for penetration between each application, that there was a significant amount of protection provided by the preservative to the rubber. This was evidenced by the absence of cracking in samples 4, 5, 9 and 10. In those samples which did not allow for the 24 hour penetration period, protection was still better than the untreated samples.

EXAMPLE 2

The preservative used in Example 1 was sponged onto the outer side wall of a standard automobile tire. The inner opposite side was left untreated for control purposes. After 24 hours, the treated side was lightly buffed with a soft cloth, and another application of the preservative was sponged over all. This application was allowed to penetrate for 24 hours followed by a light buffing and the application of an additional coat. After another 24 hours, the treated surface was lightly buffed.

The tire was then driven under normal driving conditions for 20,000 miles. At the end of this time, the outer side wall which was treated with the preservative appeared smooth, black and strong, similar to a new tire. The untreated inner wall showed the expected surface cracking and rubber deterioration normally found in tires after a period of 20,000 miles of use.

EXAMPLE 3

Substantially the procedure of Example 2 is repeated, except that the preservative composition includes an emulsion based on amine substituted dimethylpolysiloxane in place of the unsubstituted dimethylpolysiloxane emulsion of Example 1.

After application to the rubber tire as described, the tire is then driven for 10,000 miles in summer desert conditions. The treated outer side wall remains smooth and strong, while the untreated inner side wall shows severe cracking and rubber deterioration.

EXAMPLE 4

The dimethylsilicone emulsion of Example 1 without polyol additives, is used to treat the outer side wall of a tire substantially as described in Example 2. At the end of the 20,000 mile period of use, the untreated inner side wall is found to show surface cracking and severe rubber deterioration. The treated side wall is found to show surface cracking over a portion of the surface area.

Thus, while some protection is afforded using the silicone emulsion alone, substantially greater protection is provided by the preferred composition of the invention which includes diethylene glycol and glycerin as demonstrated in Examples 2 and 3.

EXAMPLE 5

A preservative composition is prepared following the procedure of Example 1. To the resulting composition is added, with stirring, 10 parts by weight of a 35% by weight aqueous emulsion of amino-substituted dimethylpolysiloxane having a viscosity of about 400 centistokes. When thoroughly mixed, the preservative composition is used to treat new, painted aluminum outdoor patio furniture having vinyl web seats.

The preservative is sponged onto the painted surfaces and vinyl plastic webbing of one patio chair, while another is untreated for control purposes. After 24 hours penetration, the surface is rewetted as before. After 24 hours, an additional rewetting of the surface is applied, followed by 24 hours of penetration and a final light buffing of the surfaces.

After 12 months outdoor exposure, the treated chair is examined and compared to the untreated chair of the same materials. At the end of this time, the untreated chair shows dullness and slight chalking of the painted surfaces, together with slight crazing, and fading in some areas. The vinyl webbing appears dulled.

The treated chair by contrast appears to have retained its new look with the painted surfaces retaining a soft lustre and no appearance of dullness, chalking, or crazing. The vinyl webbing of the treated chair also appears like new.

The invention thus described provides a process using an aqueous emulsion of dimethylpolysiloxane fluid which may be partially substituted with, for example, vinyl, trifluoropropyl, phenyl, and amino groups to preserve natural and synthetic polymers, painted surfaces, porcelain, leather, and wood.

By including from 15% to about 65% by weight, based on the weight of the silicone fluid, of a water miscible or water soluble polyol compound, a unique preservative composition is provided.

The process of the invention includes wetting the surface to be protected with the silicone emulsion or preservative composition followed by a period of penetration, preferably about 24 hours. The surface is then rewetted and allowed to penetrate in the same manner at least one more time, and preferably two more times.

While some protection is provided to surfaces using the silicone emulsion alone, significantly greater protection is provided over a longer period of time with superior surface appearance using the unique preservative according to the invention.

Various modifications are contemplated which will be apparent to those skilled in the art and can be resorted to without departing from the spirit and scope of the invention as defined by the following claims.

I claim:

1. A process for preserving and renewing the surface of a solid consisting essentially of:
   selecting a preservative composition consisting essentially of an emulsion of at least one emulsifiable organopolysiloxane fluid and based on the weight of the organopolysiloxane fluid, from about 65 percent to about 660 percent by weight of water, and from about 0.5 percent to about 10 percent by weight of diethylene glycol and from about 60 percent to about 10 percent by weight of glycerin;
   thoroughly wetting the surface of said solid with said preservative composition;
   allowing said composition to penetrate said surface and dry for an initial drying period of approximately an hour;
   lightly rubbing said surface after said initial drying period;
   allowing said composition to penetrate said surface and dry for a total period of at least about 24 hours;
   lightly buffing said surface after said total period;
   thoroughly wetting the surface of said solid again with said preservative composition;
   allowing said composition to penetrate said surface and dry for a second initial drying period of approximately one hour;
   lightly rubbing said surface after said second initial drying period;
   allowing said composition to penetrate said surface and dry for a second total period of at least about 24 hours; and
   lightly buffing said surface after said second total period.

2. A process of claim 1 wherein said organopolysiloxane fluid is a dimethylpolysiloxane fluid having a viscosity of less than about 10,000 centistokes.

* * * * *